United States Patent
Fisher (10) Patent No.: US 10,000,307 B2
(45) Date of Patent: Jun. 19, 2018

(54) TRANSPORTER DEVICE AND METHOD FOR CONVEYING OBJECTS TO BE LABELED OR STAMPED

(71) Applicant: ILLINOIS TOOL WORKS INC., Glenview, IL (US)

(72) Inventor: Joseph M. Fisher, New York, NY (US)

(73) Assignee: Illinois Tool Works Inc., Glenview, IL (US)

( * ) Notice: Subject to any disclaimer, the term of this patent is extended or adjusted under 35 U.S.C. 154(b) by 393 days.

(21) Appl. No.: 14/739,888

(22) Filed: Jun. 15, 2015

(65) Prior Publication Data

US 2015/0274345 A1    Oct. 1, 2015

Related U.S. Application Data

(62) Division of application No. 13/803,785, filed on Mar. 14, 2013.

(60) Provisional application No. 61/735,840, filed on Dec. 11, 2012.

(51) Int. Cl.
| | |
|---|---|
| *B65C 3/00* | (2006.01) |
| *B65C 1/02* | (2006.01) |
| *B65C 9/06* | (2006.01) |
| *B65C 9/02* | (2006.01) |

(52) U.S. Cl.
CPC ............... *B65C 3/00* (2013.01); *B65C 1/021* (2013.01); *B65C 9/02* (2013.01); *B65C 9/06* (2013.01); *B65G 2201/0261* (2013.01); *Y10T 156/10* (2015.01); *Y10T 156/1744* (2015.01)

(58) Field of Classification Search
CPC .. B65C 3/08; B65C 1/021; B65C 3/00; B65C 3/06; B65C 9/02; B65C 9/06
USPC .................................................. 156/556, 230
See application file for complete search history.

(56) References Cited

U.S. PATENT DOCUMENTS

| | | | | |
|---|---|---|---|---|
| 4,192,703 A | * | 3/1980 | Brown | .................... B65C 1/025 156/443 |
| 5,341,626 A | | 8/1994 | Beckmann | |
| 5,582,297 A | | 12/1996 | Carter | |
| 6,176,369 B1 | * | 1/2001 | Petrovic | ............... B65G 17/002 198/803.14 |
| 7,325,384 B2 | | 2/2008 | Culpepper | |

(Continued)

*Primary Examiner* — Philip C Tucker
*Assistant Examiner* — John Blades
(74) *Attorney, Agent, or Firm* — Christopher R. Carroll; The Small Patent Law Group, LLC (57) ABSTRACT

System including a stamping device configured to apply stamps to first and second products having target surfaces. The stamping device applies the stamps when the target surfaces are moved into a stamp-application region. The system also includes a first transporter device having a receiving side. The first transporter device is configured to hold the first products such that the target surfaces of the first products are exposed along the receiving side. The system also includes a second transporter device having a receiving side. The second transporter device is configured to hold the second products such that the target surfaces of the second products are exposed along the receiving side of the second transporter device. The first and second transporter devices are configured to hold the respective first and second products such that the target surfaces of the first and second products face in a generally common direction.

17 Claims, 5 Drawing Sheets

(56) References Cited

U.S. PATENT DOCUMENTS

| | | | |
|---|---|---|---|
| 8,132,664 B2 * | 3/2012 | Paskell | B65G 17/002 198/803.14 |
| D657,480 S * | 4/2012 | Wens | D26/13 |
| 8,944,242 B2 | 2/2015 | Ackley | |
| 2012/0180436 A1 | 7/2012 | Chait et al. | |
| 2013/0212981 A1 | 8/2013 | Chait et al. | |
| 2013/0334008 A1 | 12/2013 | Overley et al. | |
| 2014/0158275 A1 | 6/2014 | Fisher | |
| 2015/0101288 A1 | 4/2015 | Chait et al. | |
| 2015/0274345 A1 | 10/2015 | Fisher | |

\* cited by examiner

TRANSPORTER DEVICE AND METHOD FOR CONVEYING OBJECTS TO BE LABELED OR STAMPED

CROSS-REFERENCE TO RELATED APPLICATIONS

This application claims priority to and is a divisional of U.S. patent application Ser. No. 13/803,785, filed on 14 Mar. 2013, which claims the benefit of U.S. Provisional Application No. 61/735,840, filed on 11 Dec. 2012, the entire disclosures of which are incorporated herein by reference.

BACKGROUND

A device and method relating to transporting objects to be labeled or stamped is disclosed herein. Some known stamping or labeling systems apply pressure-sensitive labels to a variety of objects. One such system applies stamps (e.g., tax stamps) to products such as tobacco products (e.g., packs of cigarettes). These known systems receive a group of the products, such as a carton of several packs of cigarettes, and apply the stamps to each of the products. The packs are rectangular, which allows for the packs to be grouped together such that the groups of packs may be moved together through the labeling systems with surfaces of the packs being exposed for applying the stamps.

Products that have different shapes and/or sizes, however, such as cylindrical shaped pucks of smokeless tobacco, may not be able to be grouped together and moved through the same systems. Instead, the stamps may need to be manually and individually applied to the alternative products. This manner of applying the stamps can be costly in terms of both the time needed to apply the stamps and the additional labor costs. Specialized systems that are designed to apply the stamps to the pucks may be required, but it may not be cost-effective to use different systems for applying stamps.

BRIEF SUMMARY

In one embodiment, a system is provided that includes a stamping device configured to apply stamps to first and second products having target surfaces. The first and second products are differently shaped. The stamping device applies the stamps when the target surfaces are moved into a stamp-application region. The system also includes a first transporter device having a receiving side. The first transporter device is configured to hold the first products such that the target surfaces of the first products are exposed along the receiving side of the first transporter device. The system also includes a second transporter device having a receiving side. The second transporter device is configured to hold the second products such that the target surfaces of the second products are exposed along the receiving side of the second transporter device. The first and second transporter devices are configured to hold the first and second products, respectively, such that the target surfaces of the first and second products face in a generally common direction and have a sufficient height for the stamping device to apply the stamps.

In another embodiment, a transporter device is provided that includes a transport body having a plurality of sides including a receiving side and a longitudinal side. The receiving and longitudinal sides extend between opposite ends of the transport body. The transport body includes at least one product cavity that has a first opening along the receiving side and a second opening along the longitudinal side. The second opening along the longitudinal side is sized and shaped to receive a commercial product. The first opening permits the product to clear the receiving side and project therefrom.

In another embodiment, a method is provided that includes transporting first products into a stamp-application region. The first products may have target surfaces that are co-planar. The method may also include applying stamps to the target surfaces of the first products and transporting second products into the stamp-application region. The second products may have target surfaces that are co-planar. The method may also include applying stamps to the target surfaces of the second products. The target surfaces of the first products may have a common first contour, and the target surfaces of the second products may have a common second contour. The first and second contours may be different.

In yet another embodiment, a method is provided that includes providing a transporter device having a receiving side and a product cavity that opens to the receiving side. The method may also include loading commercial products into the product cavity. The commercial products have target surfaces configured to receive a stamp. The transporter device holds the commercial products such that the target surfaces are exposed along the receiving side of the transporter device. The target surfaces may have curved contours.

BRIEF DESCRIPTION OF THE DRAWINGS

The present inventive subject matter will be better understood from reading the following description of non-limiting embodiments, with reference to the attached drawings, wherein below.

DETAILED DESCRIPTION

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

Embodiments described herein may be used in applying stamps (e.g., labels or tax stamps) to individual objects, such as commercial products. Non-limiting examples of such products include cigarette packages (or packs), pucks of smokeless tobacco, bags of smokeless tobacco, or other tobacco products that are non-block-shaped. However, the products are not required to include tobacco or be a product that is age-restricted. As used herein, the term "stamp" includes a stamp (or label) that is used to convey information (e.g., price, information regarding the tracking or accounting of taxes, bar code, etc.) as well as a stamp (or label) that is used for decorative or ornamental purposes. A stamp may also include an RFID or other security device. In some embodiments, the systems, transporter devices, and methods described herein may be used to apply stamps to differently shaped products, such as rectangular products (e.g., cigarette packs) and cylindrical products (e.g., pucks of smokeless tobacco). The products have designated surfaces, which may be referred to as target surfaces, that are configured to receive the stamp. A contour of the target surface of a first product may be different than a contour of a target surface for a second product. For example, the target surface of the first product may be planar, but the target surface of the second product may be curved (e.g., circular side of a puck-shaped product). The systems, transporter devices, and method described herein may be similar to and include the systems, transporter devices, and methods described in U.S. Pat. Nos. 7,631,677; 7,506,485; 7,568,511; 7,533,710; 7,371,398; and 8,201,604. Each of the above patents is incorporated by reference in its entirety.

Figure 1:
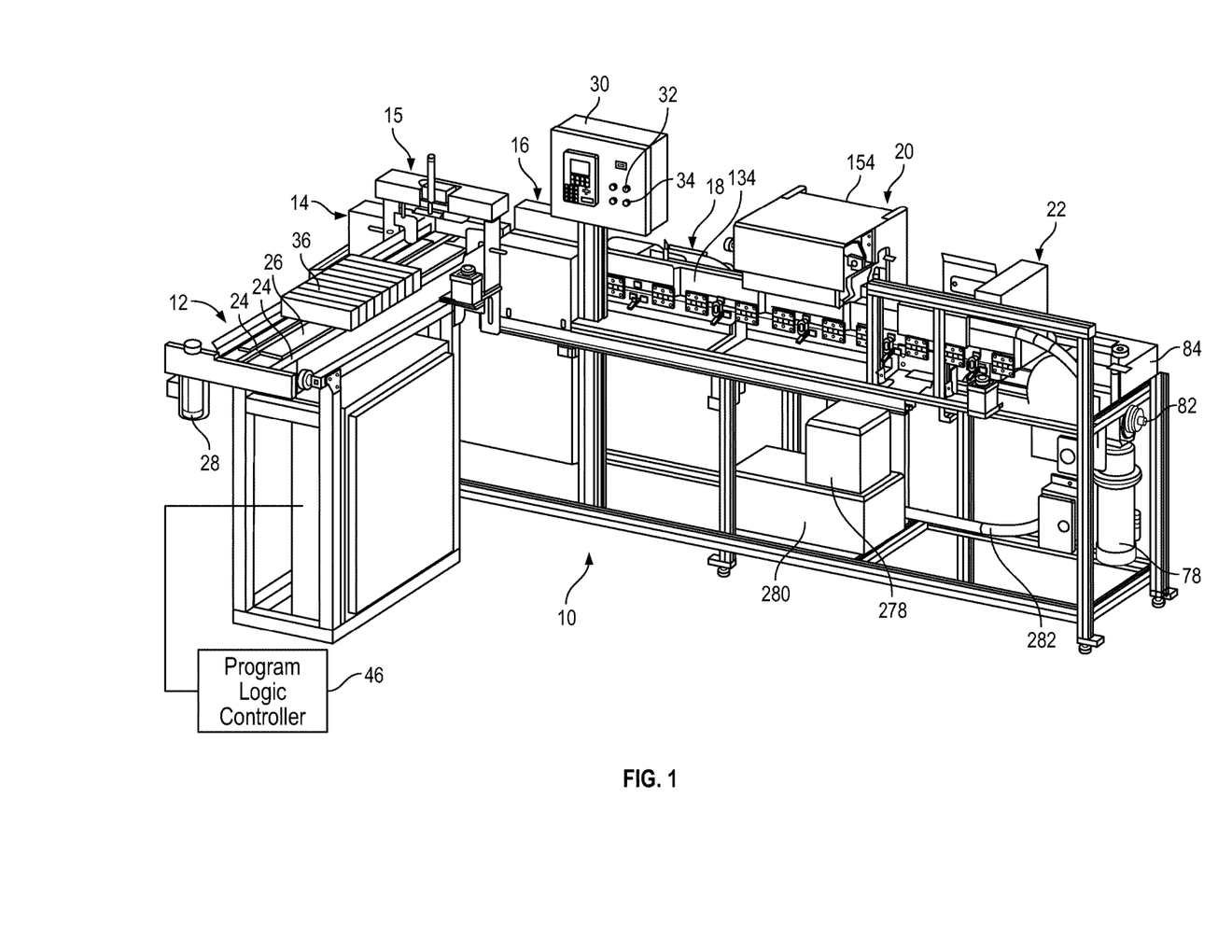
FIG. 1 is a perspective view of a stamp applicator system.

Referring now to the drawings, and more particularly to FIG. 1 thereof, a stamp applicator system 10 is shown. The stamp applicator or system 10 is seen to comprise a processing or operational line comprising a plurality of longitudinally spaced processing or operational stations at which various operations are respectively performed in connection with, or upon, each one of the transporter devices (e.g., cigarette cartons), or upon each one of the individual products contained within the transporter devices. The system 10 may be used to perform operations with transporter devices that hold rectangular packages (e.g., cigarette packages) and with transporter devices that hold non-rectangular packages, such as pucks of smokeless tobacco. More particularly, for example, in accordance with a brief but non-limiting overview or perspective of the processing or operational line of the stamp applicator machine or system 10, it is to be appreciated that the stamp applicator machine, apparatus, or system 10 is seen to comprise an in-feed station 12 at which transporter devices (e.g., cigarette cartons or other containers holding the product) and transport blocks are fed into the machine, apparatus, or system 10 for the stamp application processing thereof, a sensing and height determination station 14 for determining the height dimension of, for example, each set of transporter devices, and a loading station 15 at which the transporter devices are adapted to be engaged by means of a longitudinally oriented transport mechanism which will serially transport the transporter devices from one processing station to a subsequent processing station located along the processing line.

Accordingly, once a particular transporter device is disposed at the loading station 15, it is adapted to be engaged by a suitable conveying member of the transport mechanism for continued conveyance through the stamp applicator machine, apparatus, or system 10 so as to be serially processed at the various processing stations of the stamp applicator machine, apparatus, or system 10. In particular, then, each transporter device will be serially transported to a top flap member unsealing station 16 for severing the original adhesive bond defined between the top flap members of each transporter device whereby the top flap members of the transporter device will be disposed in a partially open state, a two-stage top flap opening station 18 at which the partially opened top flap members of each transporter device are individually opened to their full extent by means of individual top flap opening mechanisms in preparation for the application of a stamp to each one of the individual cigarette packages disposed within each transporter device, a cigarette package stamp applicator station 20 at which a pressure sensitive label (e.g., a thermally activatable waxed tax stamp) is applied to each one of the cigarette packages or other tobacco product contained within each one of the transporter devices, and a top flap closing and re-sealing station 22 at which each one of the transporter devices, having had tax stamps applied to each one of the individual cigarette packages contained therein, now has the smaller top flap member folded to its closed position, a suitable adhesive material is applied to an underside portion of the larger top flap member, the larger top flap member is subsequently folded over the smaller top flap member, and the adhesively bonded top flap members are maintained or held in their overlapped position so as to permit the adhesive material to cure and set.

Figure 2:
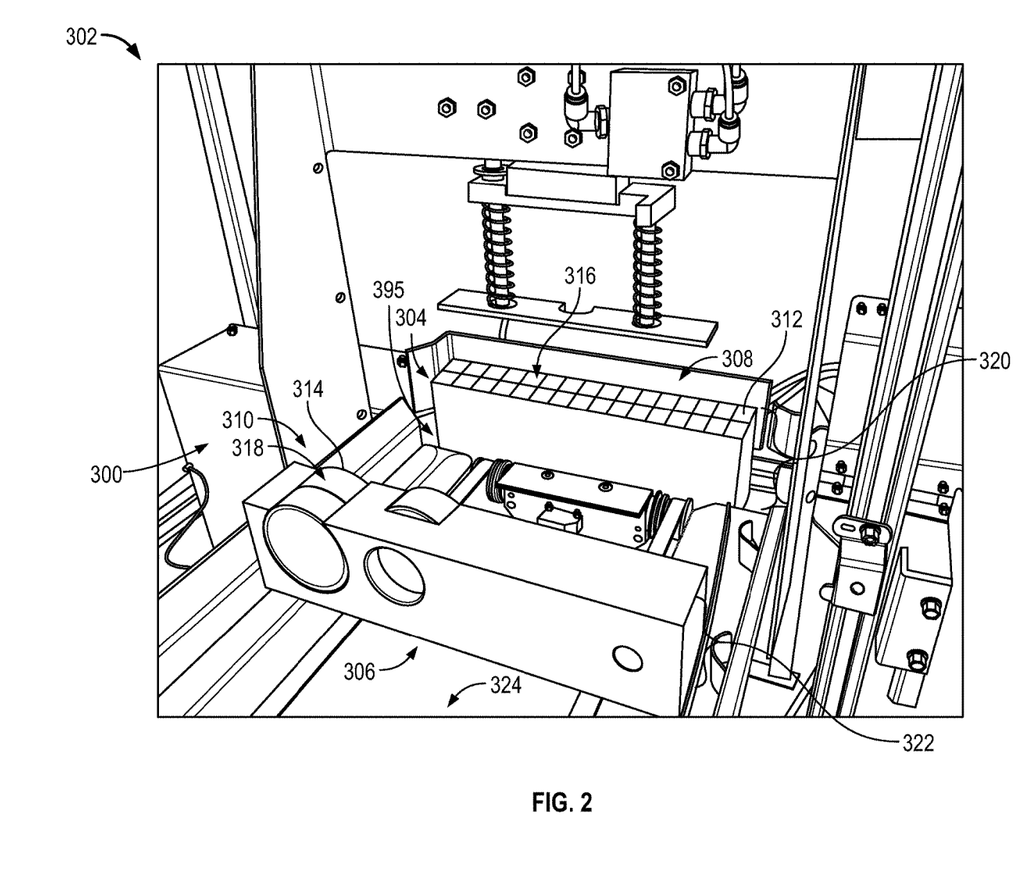
FIG. 2 is a perspective view of an in-feed station of the stamp applicator system formed in accordance with one embodiment.

FIG. 2 is a perspective view of an in-feed station 300 of a system 302 formed in accordance with one embodiment. The system 302 may be similar to the system 10 described above. For example, the system 302 is configured to receive first and second transporter device devices 304, 306 that hold first and second product sets 308, 310, respectively. The first product set 308 includes first products 312, and the second product set includes second products 314. The system 302 is configured to move the first and second transporter devices 304, 306 to a stamping device that is configured to apply stamps to the first and second products 312, 314 when the target surfaces are moved into a stamp-application region 384 (shown in FIGS. 7 and 8). The stamping device may be identical or similar to the stamp application station 20 described above.

Figure 6:
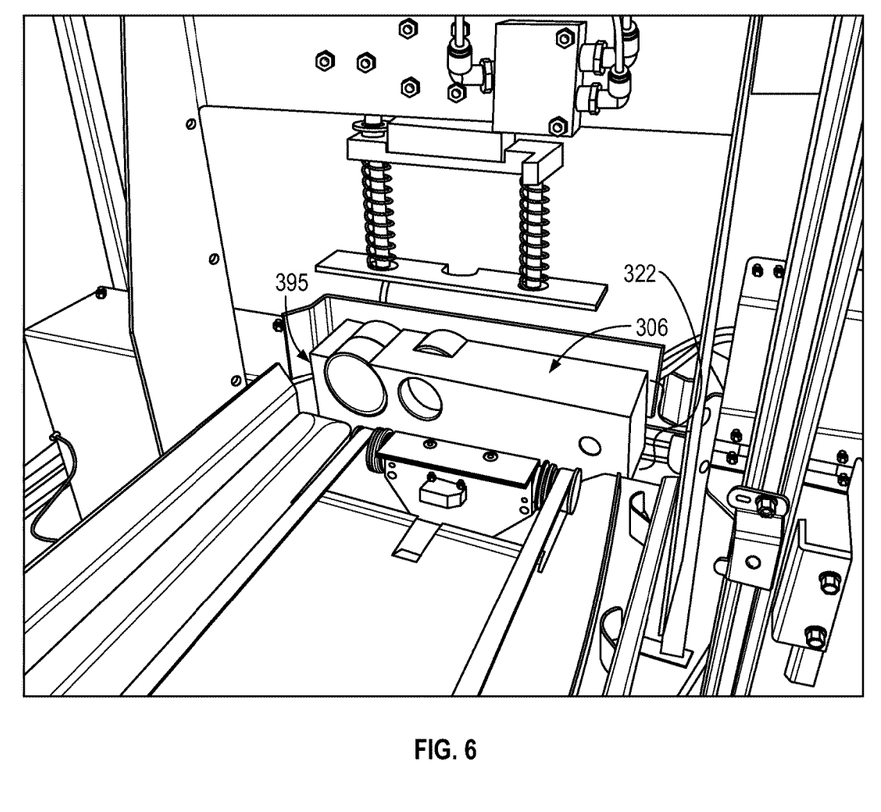
FIG. 6 is another perspective view of the transporter device of FIG. 3 being loaded into the in-feed station.

As described herein, the first and second products 312, 314 may have different dimensions (e.g., height, width, length) and/or surfaces with different contours. For example, the first and second products 312, 314 may have target surfaces 316, 318 that are configured to receive pressure-sensitive labels (e.g., stamps). The target surface 316 or 318 may be defined as the area along an exposed surface of the corresponding product that has the stamp (or a portion thereof) affixed thereto. In the illustrated embodiment, the target surface 316 is substantially planar and the target surface 318 is non-planar. The target surface 318 may have a single curved surface that is concave or convex. In FIG. 2, the target surface 318 is convex. In some embodiments, when the stamp is applied to the target surface 318, the portion of a stamp 360 that is affixed to the target surface takes the shape of the surface (e.g., convex if the target surface is convex). In other embodiments, the target surface 318 may have more than one curve or may have at least one planar surface and/or at least one curved surface. In some embodiments, the target surfaces 316, 318 are held at approximately equal heights or elevations 320, 322 from a conveyor surface 324. For example, FIG. 2 shows the transporter device 304 at a designated location 395, and FIG. 6 shows the transporter device 306 at the same designated location 395. As shown by comparing, the heights 320, 322 may be approximately equal. In other embodiments, however, the heights 320, 322 are not equal.

As shown in FIG. 2, the target surfaces 316 of the first product set 308 are held substantially co-planar with each other (e.g., along a common plane), and the target surfaces 318 of the second product set 310 are held substantially co-planar with each other (e.g., along a common plane). The common planes of the first and second products sets 308, 310 may be located a substantially equal distance away from a surface when the first and second transporter devices 304, 306 traverse the stamp-application region 384.

Figure 3:
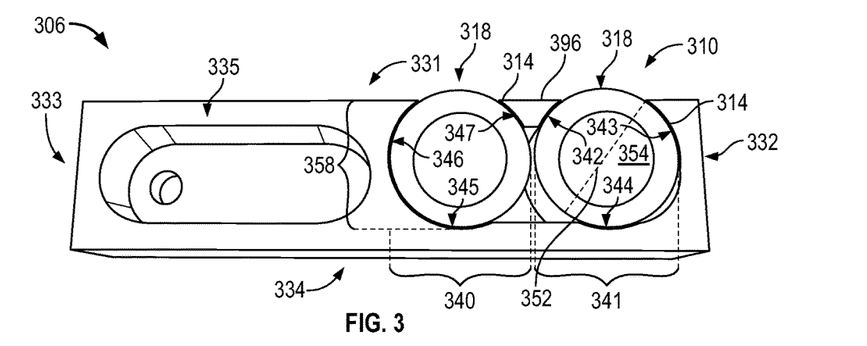
FIG. 3 is a perspective view of a transporter device that is configured to hold products in accordance with one embodiment and that be used with the system of FIG. 2.
Figure 4:
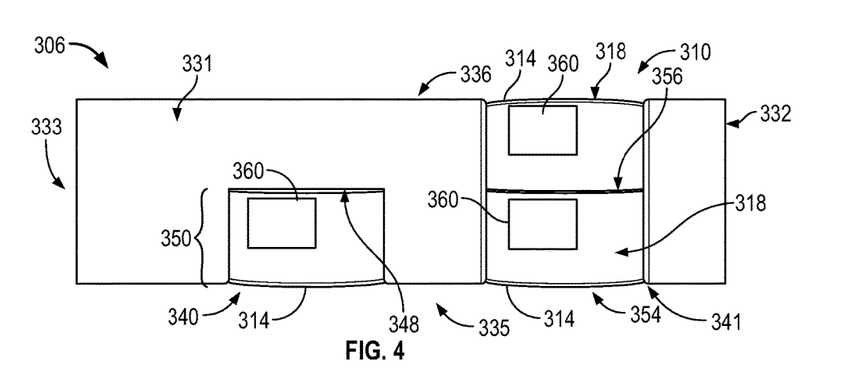
FIG. 4 is a top plan view of the transporter device of FIG. 3.
Figure 5:
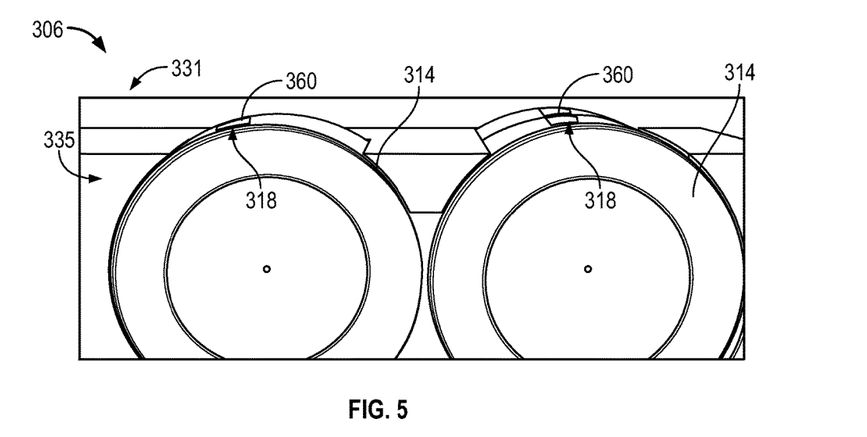
FIG. 5 is an enlarged side view of the transporter device of FIG. 3.

FIGS. 3-5 illustrate the second transporter device 306 in greater detail. FIG. 3 is a side perspective view of the transporter device 306 holding the second product set 310. FIG. 4 is a top plan view of the second transporter device 306, and FIG. 5 is an enlarged side view of the second transporter device 306. The second transporter device 306 has a plurality of sides 331-336 that include an receiving side (or face) 331, ends 332-333, a bottom side 334 that is configured to interface with the conveyor surface 324 (FIG. 2), and longitudinal sides 335, 336. In the illustrated embodiment, the second transporter device 306 is substantially block-shaped. However, the second transporter device 306 may have other configurations in other embodiments.

The second transporter device 306 is configured to hold the products 314 such that the target surfaces 318 are located at a designated position. To this end, the second transporter device 306 includes product cavities or recesses 340, 341 that are defined by interior surfaces 342-347 (shown in FIG. 3) and interior surface 348 (shown in FIG. 4). Although FIGS. 3-5 references different surfaces at 342-348, it is understood that some surfaces are portions of a common continuous surface. For example, interior surfaces 345, 346 are part of a continuous curved surface. The interior surfaces 342-348 may be sized, shaped, and located to hold the products 314 within the cavities 340, 341 so that the target surfaces 318 are located in the designated positions as shown in FIGS. 3-5.

For example, the interior surfaces 342-348 may be configured relative to the product that the second transporter device 306 will hold. With reference to FIGS. 3 and 4, the products 314 are cylindrical having a height 350 (FIG. 3) that is less than diameters 352 (FIG. 4) of circular surfaces 354, 356. More specifically, the products 314 are puck-shaped. Accordingly, the interior surfaces 342-348 are sized, shaped, and located so that the target surfaces 318 clear the receiving side 331 and are exposed for the stamping device to apply the stamps. For example, the interior surfaces 345, 344 may be located at a depth 358 that is less than the diameter 352. The interior surface 346, 347 and 342, 343 are located to hold the products 314 in a fixed longitudinal position (e.g., fixed position between the ends 332, 333). A partition or divider 396 may be defined between the interior surfaces 342, 347. The interior surface 348 and frictional forces from the other interior surfaces may operate to limit lateral movement (e.g., movement between the longitudinal sides 335, 336). Likewise, the frictional forces of any interior surface that engages the products 314 may operate to limit rotational movement of the products 314.

FIGS. 4 and 5 shows the products 314 held by the second transporter device 306 after stamps 360 have been applied to the products 314. In particular embodiments, the target surfaces 318 clear the receiving side 331 such that the target surfaces 318 are exposed along the receiving side 331. The target surfaces 318 may be non-planar. In the illustrated embodiment, the target surfaces 318 curve outwardly (e.g., are convex) and face in a generally common direction, such as away from the receiving side, so that the target surfaces 318 may receive the stamp 360.

Although not shown, the first transporter device 304 (FIG. 1) may have interior surfaces that are at least one of sized, shaped, or located differently than the interior surfaces 342-348. The interior surfaces of the first transporter device are configured to hold the target surfaces 316 (FIG. 1) at a designated position. In particular embodiments, although the interior surfaces of the first and second transporter devices 304, 306 may be different, exterior surfaces that engage the system 302 may be effectively the same. For example, the first transporter device may also have the sides 332-336 or, more specifically, ends 332-333, a bottom side 334 that is configured to interface with the conveyor surface 324, and longitudinal sides 335, 336. The transporter device 304 may also have a receiving side that is similar to the receiving side 331. In such embodiments in which the first and second transporter devices 304, 306 have exterior surfaces that engage the system 302 in effectively the same manner, the system 302 may operate (e.g., may apply stamps to the products) without substantial modification or re-configuration. For example, the sides 332-336 may be identical and, as such, the conveyor of the system 302 may deliver the first and second transporter devices 304, 306 to the stamping device. In some embodiments, the only difference between the first and second transporter devices with respect to the exterior surfaces is the height or elevation 320, 322, respectively. As described above and in the incorporated patents, the system 302 may detect the heights 320, 322 of the first and second transporter devices 304, 306 and modify the stamping device for different heights so that the stamps are properly applied.

Figure 7:
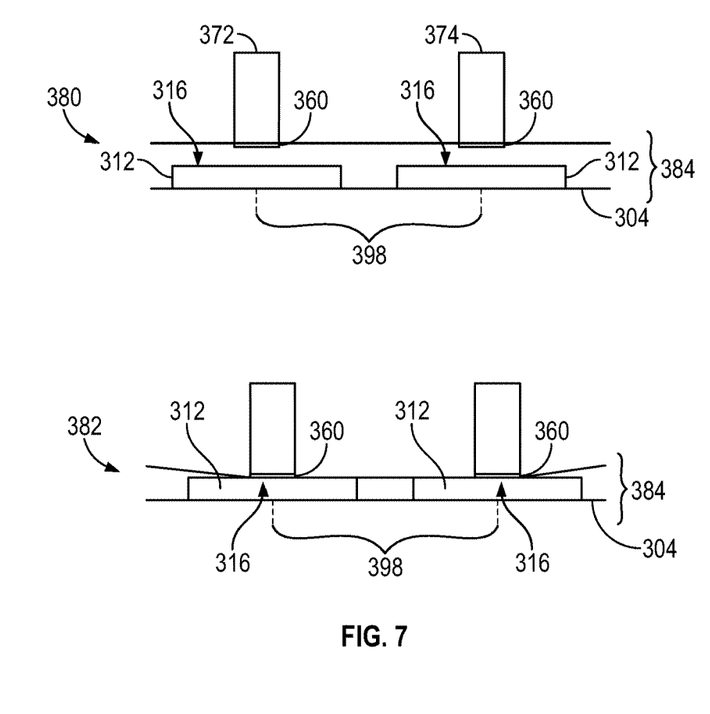
FIG. 7 illustrates schematic side views of different application stages as stamps are being applied to target surfaces of one type of product.
Figure 8:
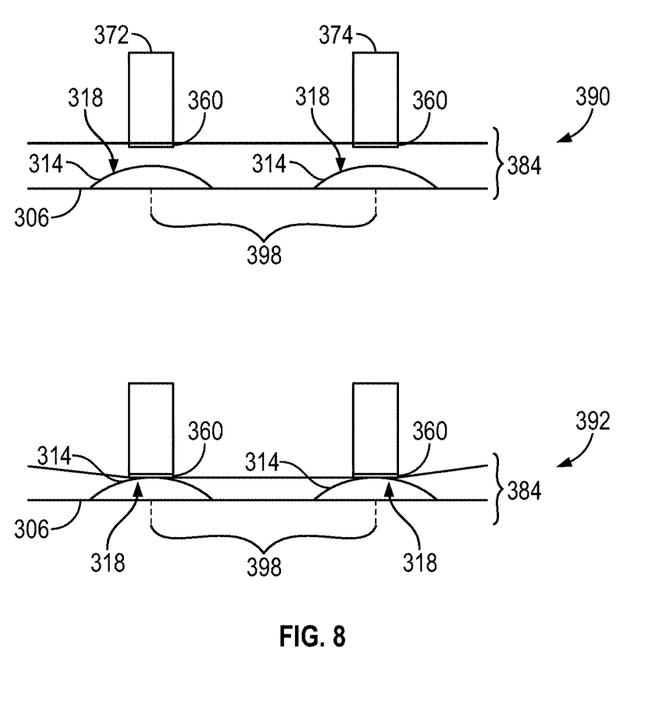
FIG. 8 illustrates schematic side views of different application stages as stamps are being applied to target surfaces of another type of product.

FIG. 7 illustrates schematic side views of application stages 380, 382 as the stamps 360 are being applied to the target surfaces 316 of the products 312, and FIG. 8 illustrates schematic side views of application stages 390, 392 as the stamps 360 are being applied to the target surfaces 318 of the products 314. In the side views, the target surfaces 316, 318 are located within a stamp-application region 384. The stamp-application region 384 represents the common space in which the stamping device (illustrated as stamping irons 372, 374) is capable of applying the stamps 360 to the target surfaces 316, 318. More specifically, in some embodiments, the target surfaces 316 may be located at a first common height (e.g., 3.5 inches) and the target surfaces 318 may be located at a different, second common height (e.g., 4.0 inches). Nonetheless, the stamping device may be configured to adapt to the different heights. Accordingly, the stamp-application region 384 includes the range of vertical space in which the stamping device is capable of applying the stamps.

As shown in FIGS. 7 and 8, the target surfaces 316 of the first products 312 have a common first contour. The target surfaces 318 of the second products 314 have a common second contour. However, the first and second contours are different. The first contour is substantially planar, and the second contour is curved. The second contour may have a single curved surface with a uniform radius of curvature. Each of the first and second transporter devices 304, 306 is configured to hold the target surfaces 316, 318, respectively, such that the target surfaces 316, 318 face in a generally common direction and have a sufficient height for the stamping device to apply the stamps 360. Also shown, the target surfaces 316 are co-planar with one another, and the target surfaces 318 are co-planar with one another. In some embodiments, the target surfaces 316 and the target surfaces 318 may be located at a common height.

In some embodiments, the target surfaces 316 are arranged in a first co-planar pattern, and the target surfaces 318 are arranged in a second co-planar pattern. The first and second co-planar patterns may be substantially identical. More specifically, longitudinally adjacent target surfaces 316 in the first co-planar pattern may be separated by a first separation distance 398 and laterally adjacent target surfaces 316 may be separated by a second separation distance (not show). Likewise, longitudinally adjacent target surfaces 318 in the second co-planar pattern may be separated by the first separation distance 398 and laterally adjacent target surfaces 318 may be separated by the second separation distance.

Embodiments described herein may also include a method of loading the second products 314 into the product cavities 340, 341. For example, the second products 314 may be stacked side-by-side in a long sleeve (not shown). By way of a specific example only, the stack of second products 314 may include 12 puck-shaped products. The sleeve of products 314 may then be advanced into one of the product cavities 340, 341 through the longitudinal side 335 until the product cavity is filled. At that point, the second transporter device 306 may be moved until the sleeve is moved to the adjacent product cavity at which time the sleeve of second products 314 may be advanced into the other product cavity through the longitudinal side 335 until the product cavity is filled. This process may be repeated with one or more transporter devices 306 until the sleeve is depleted and then may be repeated with other sleeves.

Other embodiments may include a method of packaging commercial products. The method may include the above-described method of loading the products 314 into the transporter device 306 or other methods of loading. After loading the transporter device 306 with the products 314, the transporter device 306 may be wrapped (e.g., shrink-wrapped) and/or loaded into a larger container with other transporter devices. The transporter devices 306 may then be shipped to an entity that is responsible for stamping the products 314 as described herein. The wrapping for each transporter device 306 may be removed and/or the transporter device 306 may be removed from a larger container. The transporter devices 306 may then be loaded into the system 302 as described herein.

Accordingly, embodiments may also include the transporter device 306 having the products 314 loaded therein, and methods that include receiving pre-loaded transporter devices 306 and loading the transporter devices 306 into the system 302.

In one embodiment, a system is provided that includes a stamping device configured to apply stamps to first and second products having target surfaces. The first and second products are differently shaped. The stamping device applies the stamps when the target surfaces are moved into a stamp-application region. The system also includes a first transporter device having a receiving side. The first transporter device is configured to hold the first products such that the target surfaces of the first products are exposed along the receiving side of the first transporter device. The system also includes a second transporter device having a receiving side. The second transporter device is configured to hold the second products such that the target surfaces of the second products are exposed along the receiving side of the second transporter device. The first and second transporter devices are configured to hold the first and second products, respectively, such that the target surfaces of the first and second products face in a generally common direction and have a sufficient height for the stamping device to apply the stamps.

In some aspects, the target surfaces of the first products may have a common first contour and the target surfaces of the second products may have a common second contour. The first and second contours may be different. For example, the first contour may be substantially planar and the second contour may be substantially convex. As another example, the first products may be rectangular and the second products may be cylindrical.

In some aspects, the first and second transporter devices have interior surfaces that engage the first and second products, respectively. The interior surfaces of the first and second transporter devices are shaped such that the target surfaces are positioned within the stamp-application region.

In some aspects, the first and second transporter devices are transported along a conveyor into the stamp-application region.

In another embodiment, a transporter device is provided that includes a transport body having a plurality of sides including a receiving side and a longitudinal side. The receiving and longitudinal sides extend between opposite ends of the transport body. The transport body includes at least one product cavity that has a first opening along the receiving side and a second opening along the longitudinal side. The second opening along the longitudinal side is sized and shaped to receive a commercial product. The first opening permits the product to clear the receiving side and project therefrom.

In some aspects, the commercial product is included in the transporter device. The commercial product may be cylindrical. For example, the commercial product may be puck-shaped.

In some aspects, the transport body is not capable of receiving the commercial product through the first opening.

In some aspects, the transport body includes interior surfaces that define the at least one product cavity. The interior surfaces are configured to hold the commercial product in a designated position. In some embodiments, at least one of the interior surfaces is non-planar.

In another embodiment, a method is provided that includes transporting first products into a stamp-application region. The first products may have target surfaces that are co-planar. The method may also include applying stamps to the target surfaces of the first products and transporting second products into the stamp-application region. The second products may have target surfaces that are co-planar. The method may also include applying stamps to the target surfaces of the second products. The target surfaces of the first products may have a common first contour, and the target surfaces of the second products may have a common second contour. The first and second contours may be different.

In some aspects, the first contour is substantially planar and the second contour is substantially convex.

In some aspects, the first products are rectangular and the second products are cylindrical.

In yet another embodiment, a method is provided that includes providing a transporter device having a receiving side and a product cavity that opens to the receiving side. The method may also include loading commercial products into the product cavity. The commercial products have target surfaces configured to receive a stamp. The transporter device holds the commercial products such that the target surfaces are exposed along the receiving side of the transporter device. The target surfaces may have curved contours.

In some aspects, the method may include packaging the transporter device for shipment.

In some aspects, packaging the transporter device for shipment includes at least one of loading the transporter device into a container or wrapping the transporter device in a wrapping material.

In some aspects, packaging the transporter device for shipment includes wrapping the transporter device with shrink-wrap. The shrink-wrap may press against the target surfaces.

In some aspects, the transporter device includes a longitudinal side. The receiving and longitudinal sides may extend between opposite ends of the transporter device. The product cavity may have a first opening along the receiving side and a second opening along the longitudinal side. The second opening along the longitudinal side may be sized and shaped to receive the commercial products.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While relative dimensions described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

What is claimed is:

1. A method comprising:
    transporting rectangular-shaped products in a carton transporter device toward a stamp applicator system, the rectangular-shaped products having planar target surfaces;
    applying pressure-sensitive labels to the planar target surfaces of the rectangular-shaped products in the carton transporter device using the stamp applicator system;
    transporting cylindrical-shaped puck products in a block transporter device toward the stamp applicator system, the cylindrical-shaped puck products having curved target surfaces that project out from the block transporter device toward the stamp applicator system; and
    applying the pressure-sensitive labels to the curved target surfaces of the cylindrical-shaped puck products using the stamp applicator system,
    wherein the carton transporter device and the block transporter device hold the respective rectangular-shaped products and the cylindrical-shaped puck products such that the planar target surfaces of the rectangular-shaped products and the curved target surfaces of the cylindrical-shaped puck products are an equal distance from the stamp applicator system while the pressure-sensitive labels are applied to the planar target surfaces of the rectangular-shaped products and are applied to the curved target surfaces of the cylindrical-shaped puck products.

2. The method of claim 1, wherein applying the pressure-sensitive labels to the curved target surfaces includes moving the stamp applicator system downward toward the curved target surfaces of the cylindrical-shaped puck products that project out from the block transporter device and pressing the pressure-sensitive labels onto the curved target surfaces using the stamp applicator system.

3. The method of claim 1, further comprising:
    transporting additional rectangular-shaped products in a second carton transporter device toward the stamp applicator system one or more of subsequent to or prior to applying the pressure-sensitive labels onto the curved target surfaces of the cylindrical-shaped puck products in the block transporter device, the additional rectangular-shaped products having additional planar target surfaces; and
    applying pressure-sensitive labels onto the additional planar target surfaces of the additional rectangular-shaped products using the stamp applicator system.

4. The method of claim 1, wherein applying the pressure-sensitive labels includes applying tax stamps to the cylindrical-shaped puck products using the stamp applicator system.

5. The method of claim 1, further comprising loading the cylindrical-shaped puck products into the block transporter device such that the curved target surfaces of the cylindrical-shaped puck products project out from an upper surface of the block transporter device to a common elevation from the upper surface of the block transporter device.

6. The method of claim 1, wherein the pressure-sensitive labels are applied to the curved target surfaces of the cylindrical-shaped puck products by the stamp applicator system from above the cylindrical-shaped puck products.

7. The method of claim 1, further comprising loading the cylindrical-shaped puck products into the block transporter device through one or more openings in a first side of the block transporter device such that the curved target surfaces of the cylindrical-shaped puck products project out from one or more openings in a different, second side of the block transporter device that is non-parallel to the first side of the block transporter device.

8. The method of claim 1, wherein the block transporter device includes a transport body having a plurality of sides including a receiving side and a longitudinal side, the receiving and longitudinal sides extending between opposite ends of the transport body, wherein the transport body includes at least one product cavity that has a first opening along the receiving side and a second opening along the longitudinal side, wherein the second opening along the longitudinal side is sized and shaped to receive at least one of the cylindrical-shaped puck products, the first opening permitting said at least one of the cylindrical-shaped puck products to clear the receiving side and project therefrom.

9. The method of claim 8, wherein the transport body is not capable of receiving said at least one of the cylindrical-shaped puck products through the first opening.

10. The method of claim 8, wherein the transport body includes interior surfaces that define the at least one product cavity, the interior surfaces configured to hold said at least one of the cylindrical-shaped puck products in a designated position.

11. A method comprising:
   transporting rectangular-shaped products in a carton transporter device toward a stamp applicator system, the rectangular-shaped products having planar target surfaces;
   applying pressure-sensitive labels to the planar target surfaces of the rectangular-shaped products in the carton transporter device using the stamp applicator system;
   transporting cylindrical-shaped puck products in a block transporter device into a stamp-application region, the cylindrical-shaped puck products having convex target surfaces;
   applying stamps to the convex target surfaces of the cylindrical-shaped puck products,
   wherein the carton transporter device and the block transporter device hold the respective rectangular-shaped products and the cylindrical-shaped puck products such that the planar target surfaces of the rectangular-shaped products and the convex target surfaces of the cylindrical-shaped puck products are at an equal elevation while the stamps are applied to the planar target surfaces of the rectangular-shaped products and are applied to the convex target surfaces of the cylindrical-shaped puck products.

12. A method comprising:
   transporting rectangular-shaped products in a carton transporter device toward a stamp applicator system, the rectangular-shaped products having planar target surfaces;
   applying pressure-sensitive labels to the planar target surfaces of the rectangular-shaped products in the carton transporter device using the stamp applicator system;
   loading cylindrical-shaped puck products having convex target surfaces into a first transporter device such that the curved surfaces of the cylindrical-shaved puck products project out from an upper surface of the first transporter device to a common elevation from the upper surface of the first transporter device; and
   applying the pressure-sensitive labels onto the target surfaces of the cylindrical-shaped puck products using the stamp applicator system.

13. The method of claim 12, further comprising transporting the cylindrical-shaped puck products in the first transporter device toward the stamp applicator system subsequent to loading the cylindrical-shaped puck products into the first transporter device.

14. The method of claim 12, wherein applying the pressure-sensitive labels includes moving the stamp applicator system downward toward the target surfaces of the cylindrical-shaped puck products that project out from the first transporter device and pressing the pressure-sensitive labels onto the target surfaces using the stamp applicator system.

15. The method of claim 12, wherein applying the pressure-sensitive labels includes applying tax stamps to the cylindrical-shaped puck products using the stamp applicator system.

16. The method of claim 12, wherein the pressure-sensitive labels are applied to the target surfaces of the cylindrical-shaped puck products by the stamp applicator system from above the cylindrical-shaped puck products.

17. The method of claim 12, wherein loading the cylindrical-shaped puck products into the first transporter device includes loading the cylindrical-shaped puck products into the first transporter device through one or more openings in a first side of the first transporter device such that the target surfaces of the cylindrical-shaped puck products project out from one or more openings in the upper surface of the first transporter device that is non-parallel to the first side of the first transporter device.

\* \* \* \* \*